United States Patent
Mallory

(10) Patent No.: US 7,114,399 B2
(45) Date of Patent: Oct. 3, 2006

(54) SHAPED NON-CONTACT CAPACITIVE DISPLACEMENT SENSORS FOR MEASURING SHAPED TARGETS

(75) Inventor: Roy E. Mallory, Bedford, MA (US)

(73) Assignee: ADE Corporation, Westwood, MA (US)

( * ) Notice: Subject to any disclaimer, the term of this patent is extended or adjusted under 35 U.S.C. 154(b) by 107 days.

(21) Appl. No.: 10/793,605

(22) Filed: Mar. 4, 2004

(65) Prior Publication Data

US 2004/0182168 A1    Sep. 23, 2004

Related U.S. Application Data

(60) Provisional application No. 60/455,757, filed on Mar. 19, 2003.

(51) Int. Cl.
*G01B 7/16* (2006.01)
*G01L 1/00* (2006.01)
(52) U.S. Cl. ....................................................... 73/780
(58) Field of Classification Search ................... 73/780
See application file for complete search history.

(56) References Cited

U.S. PATENT DOCUMENTS

| 4,766,368 A | * | 8/1988 | Cox ............................ 324/688 |
| 4,864,300 A | | 9/1989 | Zaremba ........................ 341/6 |
| 5,337,353 A | * | 8/1994 | Boie et al. ............. 379/433.01 |
| 5,651,044 A | * | 7/1997 | Klotz, Jr. et al. ............ 378/117 |
| 6,400,162 B1 | | 6/2002 | Mallory et al. .............. 324/688 |
| 6,700,392 B1 | * | 3/2004 | Haase ......................... 324/674 |

* cited by examiner

*Primary Examiner*—Edward Lefkowitz
*Assistant Examiner*—Octavia Davis
(74) *Attorney, Agent, or Firm*—Weingarten, Schurgin, Gagnebin & Lebovici LLP

(57) ABSTRACT

An improved non-contact capacitive displacement sensor that may be employed for accurately measuring small distances between the sensor and shaped targets. The non-contact capacitive displacement sensor includes a probe having a sensor element and a guard element. The guard element substantially surrounds the sensor element. At least the sensor element has a shape that substantially matches the shape of a target element.

18 Claims, 4 Drawing Sheets

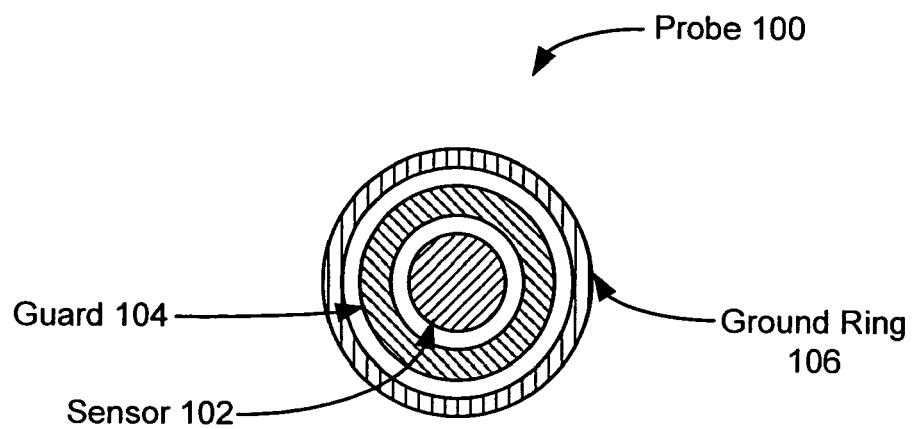
Fig. 1 - Prior Art
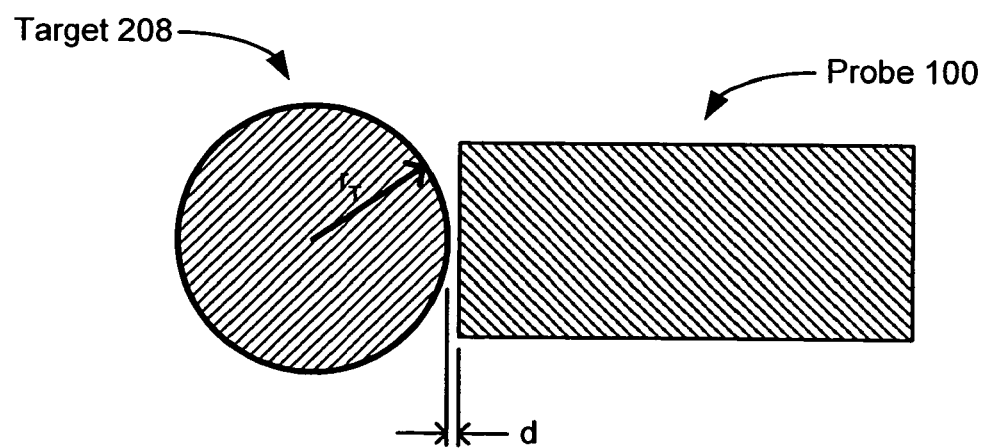
Fig. 2 - Prior Art

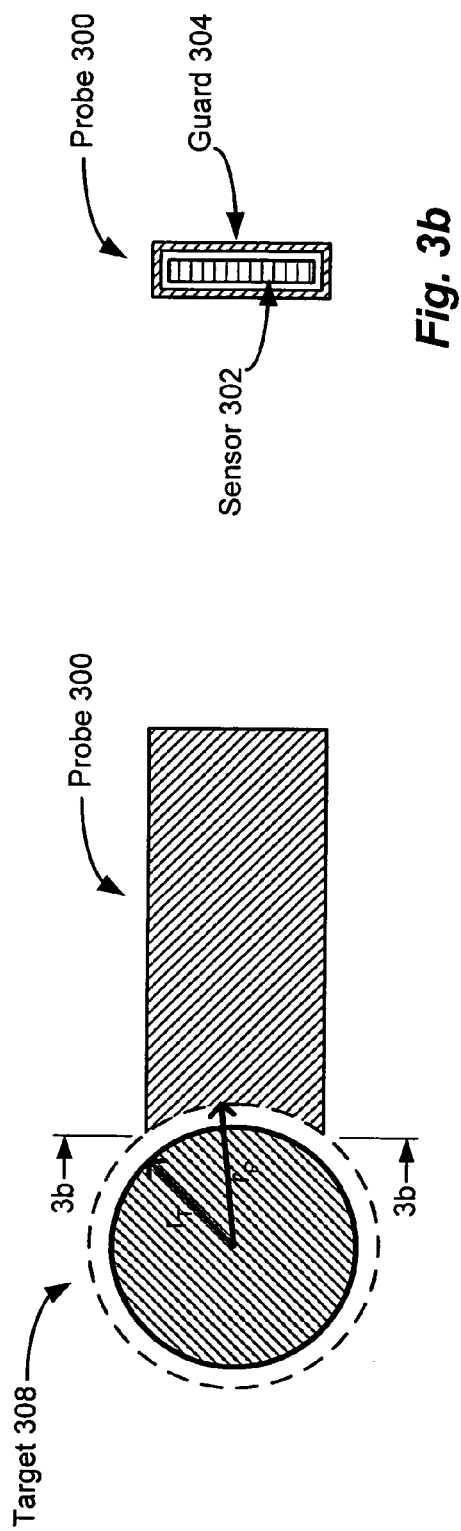
*Fig. 3a*
*Fig. 3b*
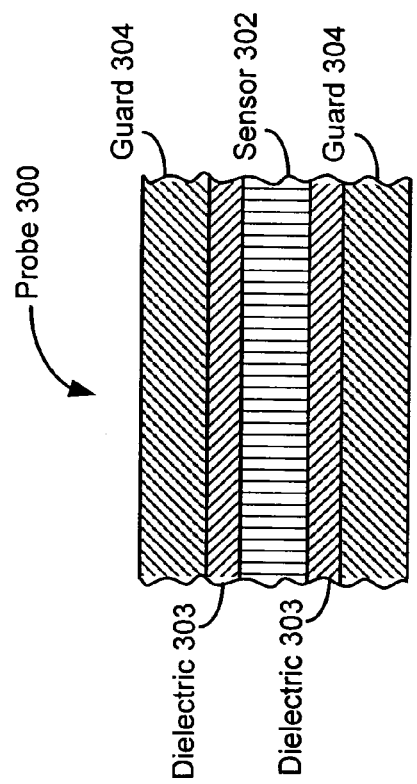
*Fig. 3c*

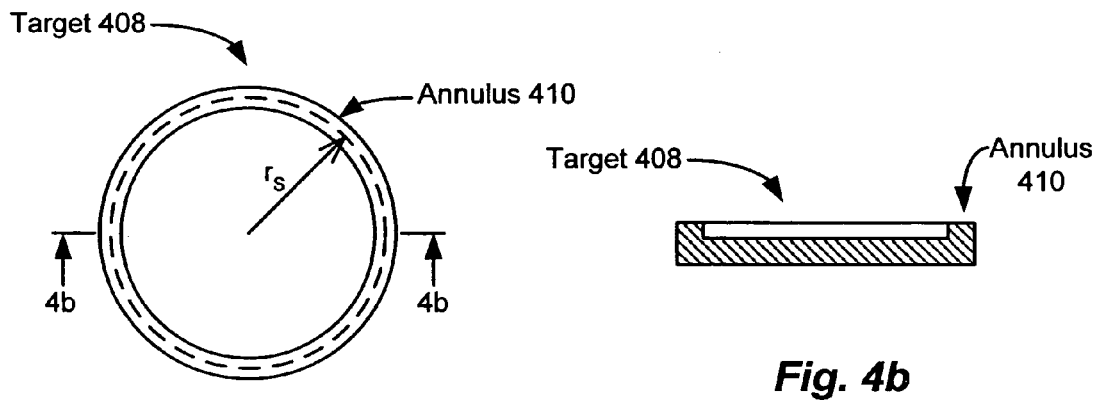
Fig. 4a
Fig. 4b
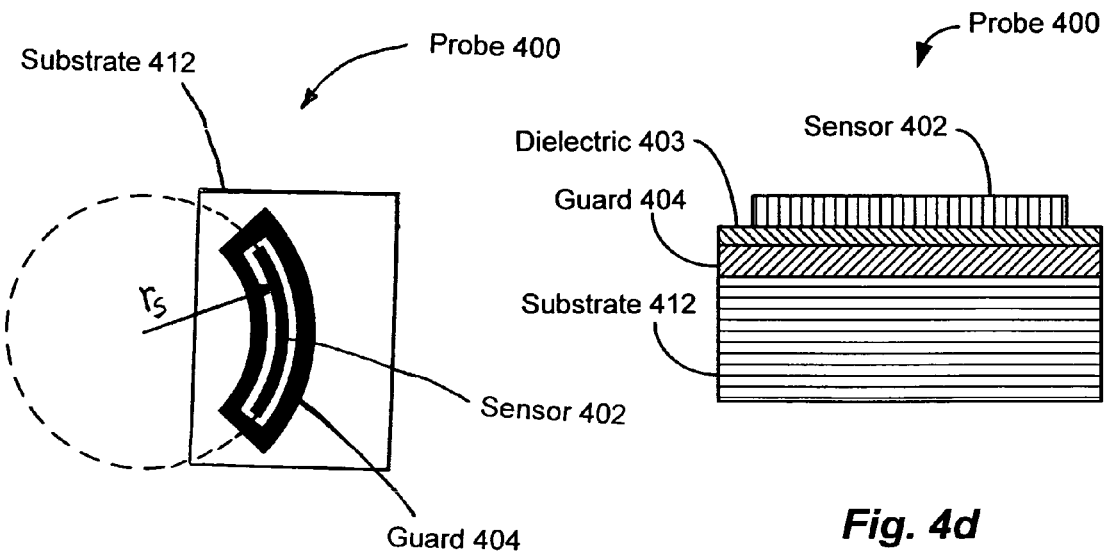
Fig. 4c
Fig. 4d

SHAPED NON-CONTACT CAPACITIVE DISPLACEMENT SENSORS FOR MEASURING SHAPED TARGETS

CROSS REFERENCE TO RELATED APPLICATIONS

The present application claims priority of U.S. Provisional Patent Application No. 60/455,757 filed Mar. 19, 2003 entitled SHAPED NON-CONTACT CAPACITIVE DISPLACEMENT SENSORS FOR MEASURING SHAPED TARGETS.

STATEMENT REGARDING FEDERALLY SPONSORED RESEARCH OR DEVELOPMENT

N/A

BACKGROUND OF THE INVENTION

The present application relates generally to non-contact capacitive displacement sensors, and more specifically to a non-contact capacitive displacement sensor capable of accurately measuring a distance between the sensor and a shaped target.

Non-contact capacitive displacement sensors are known that may be employed to measure small distances between a sensor element and a target element by detecting variations in the capacitance between the sensor and the target. A conventional non-contact capacitive displacement sensor typically comprises a probe device including a sensor element, a guard element, and a ground element. The guard element is configured to surround the sensor element, thereby making the sensor less sensitive to capacitance that might develop between the sensor and other portions of the probe. The ground element is configured to surround the guard element. Specifically, the ground element constitutes a part of the structure of the probe. For example, the ground element may be configured as a ring providing a surface for use in mounting the probe. It is noted that the guard and/or the ground ring may be omitted from some probe configurations. The sensor element, the guard element, and the ground element of the conventional probe device typically comprise respective machined metallic parts that are bonded together in a manufacturing process to form the overall probe structure.

In a typical mode of operation, the sensor element of the conventional probe device forms one plate of a capacitor, the target element forms the other plate of the capacitor, and the distance between the probe and the target is determined by detecting the variation in the capacitance between the respective conductive plates. The detected capacitance varies with the distance between the probe and the target, and this variation in capacitance provides a measurement signal that may subsequently be processed to produce an output signal indicative of the distance or a change in the distance.

However, the conventional non-contact capacitive displacement sensor described above has several drawbacks. For example, because the various elements of the conventional probe device typically comprise individual machined parts, the process for manufacturing the probe can be highly labor intensive, which can cause an increase in the overall cost of the sensor.

In addition, using the conventional non-contact capacitive displacement sensor to obtain distance measurements can be problematic when measuring the distance between the sensor and a shaped target, i.e., a target element having a shape that does not approximate a flat conductive plate. For example, the target element may be a disk, and it may be desirable to use the conventional probe device to measure a distance between the probe and an edge of the disk. In this example, the edge of the disk is not flat, but instead follows the circular contour of the disk. As a result, the combination of the sensor element and the target element (i.e., the disk edge) does not form a parallel-plate capacitor, and conventional methods of determining the capacitance between two parallel plates cannot be used for accurately measuring the distance between the probe and the shaped target.

It would therefore be desirable to have an improved non-contact capacitive displacement sensor. Such a capacitive displacement sensor would be capable of accurately measuring small distances between the sensor and shaped targets. It would also be desirable to have a non-contact capacitive displacement sensor that is easier and less costly to manufacture.

BRIEF SUMMARY OF THE INVENTION

In accordance with the present invention, an improved non-contact capacitive displacement sensor is provided that may be employed for accurately measuring small distances between the sensor and shaped targets. Benefits of the presently disclosed capacitive displacement sensor are achieved by providing a sensor element having a shape that substantially matches the shape of the target.

In one embodiment, the non-contact capacitive displacement sensor comprises a probe including a sensor element, a guard element, and a ground element. The guard element substantially surrounds the sensor element, and the ground element substantially surrounds the guard element. Further, at least the sensor element has a shape that substantially matches the shape of a target element. In an alternative embodiment, the ground element may partially surround the sensor and guard elements, or the guard and/or the ground elements may be omitted.

For example, in the event the target element is a disk, the sensor element may be shaped to have a radius of curvature that matches the contour of an edge of the disk. In this way, a uniform distance may be maintained between the shaped sensor element and the shaped target, e.g., the disk edge. The sensor element may then be employed to measure the uniform distance between the sensor and the disk edge.

This embodiment of the non-contact capacitive displacement sensor is fabricated using a lamination technique. For example, the lamination technique may be employed to form a stack comprising the sensor element, a plurality of dielectric element layers, and the guard element. In this example, the sensor element is disposed between two dielectric layers, and the guard element comprises two conductive planes laminated to the dielectric layers, respectively. Further, lamination techniques like those used to manufacture flexible printed circuit boards may be employed to allow a flexible sensor element to be shaped to match the contour of the target element.

In the event the structure of the disk includes a raised annulus, the probe may alternatively include a sensor element shaped to have a radius of curvature that matches the contour of the annulus. For example, this alternative shaped sensor element may be employed to measure an axial position of the annulus. In this example, the probe may be disposed substantially perpendicular to the plane of the annulus when measuring the annulus axial position.

This alternative embodiment of the non-contact capacitive displacement sensor is fabricated by forming a silkscreened, laser cut, or photolithographically delineated conductive layer pattern, and applying the patterned conductive layer to a substrate. Further, patterning techniques like those used to manufacture flexible printed circuit boards may be employed to allow a flexible sensor element to be shaped to match the contour of the target element.

By providing a non-contact capacitive displacement sensor having a sensor element with a shape that substantially matches that of a target element, small distances between the sensor element and the target element can be measured by determining the capacitance between the sensor and the target. Further, by employing lamination and/or patterning techniques like those used to fabricate flexible printed circuit boards, shaped sensor elements can be made for reduced cost.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1 is an end view of a conventional probe device including a circular sensor element;

FIG. 2 is a side view of the conventional probe device of FIG. 1 being used to measure a distance between the probe and a circular target element;

FIG. 3a is a side view of a non-contact capacitive displacement sensor according to the present invention being used to measure a distance between the sensor and a circular target element;

FIG. 3b is an end view of the non-contact capacitive displacement sensor of FIG. 3a;

FIG. 3c is a cross-sectional view illustrating a laminated stacked structure of the non-contact capacitive displacement sensor of FIG. 3a;

FIG. 4a is a plan view of a shaped target element;

FIG. 4b is a cross-sectional view of the shaped target element of FIG. 4a;

FIG. 4c is a plan view of a non-contact capacitive displacement sensor according to the present invention that may be used to measure a distance between the sensor and the shaped target element of FIG. 4a;

FIG. 4d is a cross-sectional view illustrating a conductive pattern comprising a sensor element and a guard element applied to a substrate of the non-contact capacitive displacement sensor of FIG. 4c;

FIG. 5a is a flow diagram of a method of manufacturing the non-contact capacitive displacement sensor of FIG. 3a.

DETAILED DESCRIPTION OF THE INVENTION

Figure 5A:
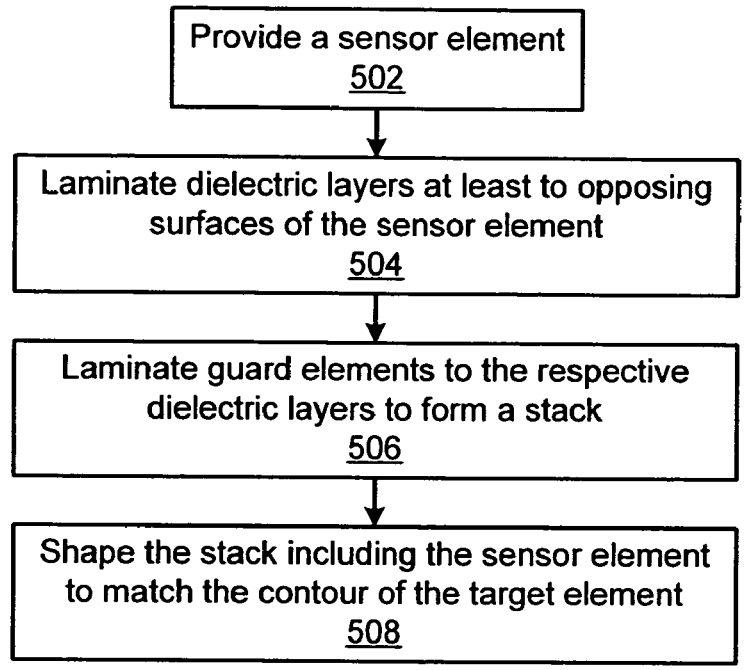

U.S. Provisional Patent Application No. 60/455,757 filed Mar. 19, 2003 entitled SHAPED NON-CONTACT CAPACITIVE DISPLACEMENT SENSORS FOR MEASURING SHAPED TARGETS is incorporated herein by reference.

An improved non-contact capacitive displacement sensor is disclosed that may be employed for accurately measuring a distance between the sensor and a shaped target. The presently disclosed capacitive displacement sensor includes a sensor element having a shape that substantially matches the shape of the target element.

In general, capacitive displacement sensors provide displacement measurements without physically contacting the surface of the target being measured. A conventional capacitive displacement sensor typically includes a probe having a plate, which forms one plate of a capacitor. The other plate of the capacitor comprises the target whose displacement is being measured. In a typical mode of operation, the probe is brought into proximity with the target surface being measured, thereby forming the capacitor. The distance from the probe to the target can then be derived by measuring this capacitance because the relationship between distance and capacitance is known. Specifically, for an ideal parallel-plate capacitor, capacitance and distance are related by the equation $$C = \epsilon_0 A/d, \qquad (1)$$

in which "C" is the capacitance, "$\epsilon_0$" is the permittivity of free space, "A" is the area of the probe's sensor element, and "d" is the distance from the sensor to the target. As defined by equation (1), as the probe-to-target distance changes, there is a concomitant change in the capacitance C.

Those of ordinary skill in this art will appreciate from equation (1) above that the sensing area A of the probe is at least of some minimum size so that the capacitance developed between the probe and the target is large enough to be detected and subsequently processed.

FIG. 1 depicts an end view of a conventional non-contact capacitive displacement sensor comprising a probe 100 that includes a circular sensor element 102, a guard element 104, and a ground element 106. As shown in FIG. 1, the guard 104 surrounds the circular sensor 102, and the ground element 106 forms a ring that surrounds the guard 104. The guard 104 is configured to make the sensor 102 less sensitive to capacitance that might develop between the sensor 102 and other portions of the probe 100. Further, the ground ring 106, which forms a part of the structure of the probe 100, provides a surface that may be used to mount the probe 100. The conventional probe 100 including the circular sensor 102 is generally insensitive to rotation about the probe's axis, and typically provides a maximum sensing area for its dimension. Moreover, the sensor 102, the guard 104, and the ground ring 106 typically comprise respective machined metallic parts, which are bonded together to form the overall structure of the probe 100.

One drawback of the conventional probe 100 of FIG. 1 is that it may be incapable of accurately measuring a distance between the sensor 102 and a target having a non-planar surface. For example, FIG. 2 depicts a side view of the conventional probe 100, and a target 208 having a cylindrical surface. As shown in FIG. 2, the probe 100 is used to measure a distance "d" between the sensor included in the probe 100 and the cylindrical target 208.

It is appreciated that the conventional probe 100 may be employed for accurately measuring the distance between the sensor and a cylindrical target if the radius of the cylinder is large. However, if the radius of the cylindrical target is small, then the sensor may be incapable of developing a capacitance large enough to be detected and subsequently processed without coming excessively close to the target.

Such a cylindrical target having a small radius "$r_T$" is depicted in FIG. 2. Because the radius $r_T$ of the target 208 is small, the conventional probe 100 must come to within the small distance d of the target 208 to develop a capacitance large enough for detection and subsequent processing. Further, it is noted that the capacitor formed by the sensor within the probe 100 and the cylindrical surface of the target 208 does not approximate a parallel-plate capacitor, and therefore equation (1) describing the general relationship between capacitance and distance for a parallel-plate capacitor may not yield accurate results for the distance d.

FIG. 3a depicts an illustrative embodiment of a non-contact capacitive displacement sensor including a probe 300, in accordance with the present invention. In the illustrated embodiment, the probe 300 has a shape that substantially matches the contour of a target 308. In the event the axial height of the target 308 is large, e.g., the target 302 may be a cylinder, the probe 300 is shaped to substantially match the contour of the surface of the cylinder. In the event the axial height of the target 308 is small, e.g., the target 308 may be a disk, the probe 300 is shaped to substantially match the contour of the edge of the disk.

It is noted that the cylindrical target 308 has a relatively small radius "$r_T$", as depicted in FIG. 3a. As described above, the probe 300 has a shape that substantially matches the contour of the target 308. Accordingly, the probe 300 including a sensor element 302 (see FIG. 3b) is shaped to have a radius of curvature "$r_P$" that substantially matches the contour of the cylinder surface, thereby allowing the sensor 302 to measure a uniform distance "$r_P - r_T$" between the shaped sensor 302 and the shaped target 308.

It will be appreciated that even though the radius $r_T$ of the target 308 is small, the probe 300 need not come excessively close to the target 308 to develop a detectable capacitance between the sensor 302 and the target 308. This is because the shaped sensor 302 is configured to maintain the uniform distance $r_P - r_T$ between the sensor 302 and the cylindrical surface of the target 308. Moreover, because the distance between the sensor 302 and the target 308 is uniform, known formulas such as equation (1) describing the general relationship between capacitance and distance for a parallel-plate capacitor may be employed to obtain an accurate measurement of the uniform distance $r_P - r_T$.

FIG. 3b depicts an end view of the probe 300 (see also FIG. 3a). As shown in FIG. 3b, the probe 300 has a rectangular cross-section. Specifically, the probe 300 includes a rectangular sensor element 302 and a guard element 304 surrounding the sensor element 302. Because the cross-section of the sensor 302 is rectangular, the amount of axial cylinder height required for the sensor 302 is reduced. The guard 304 is configured to make the sensor 302 less sensitive to capacitance that might develop between the sensor 302 and other portions of the probe 300.

As described above, both the radius $r_T$ and the axial height of the target 308 may be relatively small, e.g., the target 308 may be a disk. FIG. 3c depicts a preferred implementation of the probe 300, which may be employed to measure a distance from the probe 300 to the disk target 308. Specifically, the probe 300 of FIG. 3c comprises a stack including two dielectric layers 303, the sensor element 302 disposed between the two dielectric layers 303, and the guard element 304 surrounding the two dielectric layers 303. In the preferred embodiment, the probe 300 of FIG. 3c is fabricated by a lamination technique, in which the dielectric layers 303 are laminated to the sensor element 302, and the guard elements 304 are laminated to the dielectric layers 303. Further, lamination techniques like those used to manufacture flexible printed circuit boards may be employed to allow a flexible sensor element such as the sensor 302 to be shaped to match the contour of the disk target 308. It is noted that lamination techniques like those used to manufacture rigid printed circuit boards, or any other suitable lamination technique that allows electrically conductive layers to be stacked between non-electrically conductive layers, may be alternatively employed.

FIG. 4a depicts another representative target element 408 that may be measured using a non-contact capacitive displacement sensor according to the present invention. Specifically, the target element 408 is a disk with a raised annulus 410 whose axial position needs to be measured. A cross-sectional view of the disk target 408 including the annulus 410 is depicted in FIG. 4b. In the presently disclosed embodiment, the radius of the disk target 408 is relatively small, and the annulus 410 is relatively narrow.

FIG. 4c depicts an illustrative embodiment of a non-contact capacitive displacement sensor including a probe 400, in accordance with the present invention. In the illustrated embodiment, the probe 400 has a shape that substantially matches the contour of the target 408, particularly, the contour of the annulus 410. Specifically, the probe 400 includes a sensor 402 and a guard 404 substantially surrounding the sensor 402, in which the combination of the sensor 402 and the guard 404 is disposed on a surface of a substrate 412. As shown in FIG. 4c, the shape of the sensor 402 is that of a section of a ring whose radius of curvature "$r_S$" matches the radius of the annulus 410. In the preferred embodiment, the width of the sensor 402 is made slightly narrower than the corresponding width of the annulus 410. As a result, the probe 400 may be positioned so that there is a uniform distance between the sensor 402 and the annulus 410, and therefore known formulas such as equation (1) above may be employed to obtain an accurate measurement of the uniform distance separating the sensor 402 and the annulus 410.

In the presently disclosed embodiment, the substrate 412 has a rectangular cross-section. It will be appreciated, however, that the substrate may have any other suitable shape, e.g., to avoid various features that might be mounted proximate to the target 408, or to avoid other features of the target itself. It is further appreciated that the guard 404 may have an arc-like shape, as shown in FIG. 4c, or any other suitable shape.

FIG. 4d depicts a preferred implementation of the probe 400, which may be employed to measure the distance from the probe 400 to the annulus 410. Specifically, the probe 400 of FIG. 4d comprises a first conductive layer forming the guard 404 applied to a surface of the substrate 412, a dielectric layer 403 disposed on the guard 404, and a second conductive layer forming the sensor 402 applied to the dielectric layer 403. The first conductive layer is optionally patterned to form the guard 404, and the second conductive layer is patterned to form the sensor 402. In the preferred embodiment, the probe 400 is fabricated by a silk-screening technique, a laser cutting technique, or a photolithography technique, which is used to delineate the conductive layer patterns. Technologies for implementing these techniques include thick-film technologies, thin-film technologies, technologies like those used to manufacture rigid and flexible printed circuit boards, or any other suitable technology that may be used to apply a thin patterned conductive layer to a substrate.

A method of fabricating a non-contact capacitive displacement sensor including the probe 300 depicted in FIG. 3c is illustrated by reference to FIG. 5a. In this illustrative method, a lamination technique like that used to fabricate flexible printed circuit boards is employed to allow the resulting probe to be shaped to match the contour of a target element. As depicted in step 502, a sensor element is provided. Next, dielectric layers are laminated, as depicted in step 504, at least to opposing surfaces of the sensor element, respectively. Guard elements are then laminated, as depicted in step 506, to the respective dielectric layers, thereby forming a stack of conductive elements (i.e., the sensor element and the guard elements) separated by the dielectric layers. Finally, the stack including the sensor element is shaped, as depicted in step 508, to match the contour of the target element.

Figure 5B:
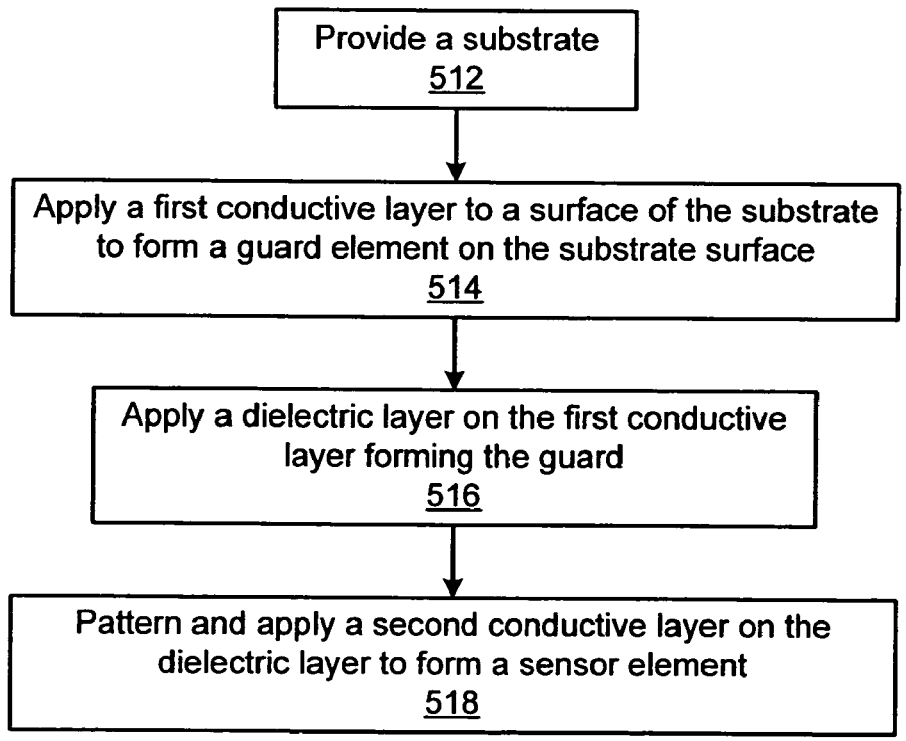
FIG. 5b is a flow diagram of a method of manufacturing the non-contact capacitive displacement sensor of FIG. 4c.

A method of fabricating a non-contact capacitive displacement sensor including the probe 400 depicted in FIG. 4*d* is illustrated by reference to FIG. 5*b*. As depicted in step 512, a substrate is provided. Next, a first conductive layer is applied, as depicted in step 514, to a surface of the substrate to form the guard element on the substrate surface. The first conductive layer is optionally patterned so that the guard element substantially surrounds the sensor element applied in step 518. The dielectric layer is then applied, as depicted in step 516, on the first conductive layer forming the guard. Next, a second conductive layer is patterned and applied, as depicted in step 518, on the dielectric layer to form the sensor. The second conductive layer is patterned so that the sensor element matches the contour of the target element.

It will be appreciated by those of ordinary skill in the art that modifications to and variations of the above-described shaped non-contact capacitive displacement sensors for measuring shaped targets may be made without departing from the inventive concepts disclosed herein. For example, other probes shaped for use with targets having shapes and dimensions different from those described above may be fabricated using the techniques disclosed herein. Such a probe may include at least one sensor element shaped to substantially match at least one desired nonlinear or non-planar feature of a target to be measured. Accordingly, the invention should not be viewed as limited except as by the scope and spirit of the appended claims.

What is claimed is:

1. A non-contact capacitive displacement sensor for measuring a distance to at least one target element, said target element having at least one of a non-linear shaped surface characteristic and a non-planar shaped surface characteristic, said non-contact capacitive displacement sensor comprising:
at least one conductive sensor element, said conductive sensor element having at least one of a non-linear shaped surface and a non-planar shaped surface configured to conform to a contour of said at least one of a non-linear shaped surface characteristic and a non-planar shaped surface characteristic of said target element to be measured,
thereby allowing a uniform distance to be maintained between the shaped surface of the sensor element and the shaped surface characteristic of the target element while the sensor element is disposed proximate to the target element.

2. The sensor of claim 1 further including a conductive guard element configured to substantially surround the sensor element.

3. The sensor of claim 2 further including a ground element configured to substantially surround the guard element.

4. The sensor of claim 2 further including at least one non-conductive element disposed between the sensor element and the guard element surrounding the sensor element.

5. The sensor of claim 4 wherein at least the sensor element has at least one of a non-linear shaped surface and a non-planar shaped surface configured to conform to the contour of said at least one of a non-linear shaped surface characteristic and a non-planar shaped surface characteristic of said target element to be measured.

6. The sensor of claim 1 further including a ground element configured to substantially surround the sensor element.

7. The sensor of claim 1 further including a substrate, the sensor element being disposed on the substrate.

8. The sensor of claim 7 wherein the sensor element comprises a conductive layer disposed on the substrate, the conductive layer being patterned to conform to the contour of said at least one of a non-linear shaped surface characteristic and a non-planar shaped surface characteristic of said target element to be measured.

9. A method of fabricating a non-contact capacitive displacement sensor, said non-contact capacitive displacement sensor being operative to measure a distance to at least one target element, said target element having at least one of a non-linear shaped surface characteristic and a non-planar shaped surface characteristic, said method comprising the steps of:
providing a conductive sensor element;
applying at least one non-conductive layer to a surface of the sensor element,
thereby substantially surrounding the sensor element with the non-conductive layer;
applying at least one conductive layer to a surface of the non-conductive layer,
thereby substantially surrounding the non-conductive layer with the conductive layer; and
shaping at least one surface of at least the sensor element to form at least one of a non-linear shaped surface and a non-planar shaped surface configured to conform to a contour of said at least one of a non-linear shaped surface characteristic and a non-planar shaped surface characteristic of said target element to be measured,
thereby allowing a uniform distance to be maintained between the shaped surface of the sensor element and the shaped surface characteristic of the target element while the sensor element is disposed proximate to the target element.

10. The method of claim 9 wherein the first applying step includes laminating the at least one non-conductive layer to the surface of the sensor element.

11. The method of claim 9 wherein the second applying step includes laminating the at least one conductive layer to the surface of the non-conductive layer.

12. The method of claim 9 wherein the at least one non-conductive layer comprises a dielectric layer.

13. The method of claim 9 wherein the first applying step includes laminating the at least one non-conductive layer to the surface of the sensor element, and wherein the second applying step includes laminating the at least one conductive layer to the surface of the non-conductive layer, thereby forming a stack of conductive layers separated by at least one non-conductive layer.

14. A method of fabricating a non-contact capacitive displacement sensor, said non-contact capacitive displacement sensor being operative to measure a distance to at least one target element, said target element having at least one of a non-linear shaped surface characteristic and a non-planar shaped surface characteristic, said method comprising the steps of:
providing a substrate; and
disposing at least one conductive layer on the substrate, wherein the at least one conductive layer is patterned to form at least one sensor element on the substrate, and wherein the at least one sensor element has at least one of a non-linear shaped surface and a non-planar shaped surface configured to conform to a contour of said at least one of a non-linear shaped surface characteristic and a non-planar shaped surface characteristic of said target element to be measured, thereby allowing a uniform distance to be maintained between the shaped surface of the sensor element and the shaped surface characteristic of the target element while the sensor element is disposed proximate to the target element.

15. The method of claim 14 wherein the at least one conductive layer includes a first conductive layer comprising a guard element and a second conductive layer comprising the sensor element, the guard element substantially surrounding the sensor element, the guard element being disposed between the substrate and the sensor element.

16. The method of claim 14 wherein the disposing step includes applying the at least one conductive layer to a surface of the substrate by a silk-screening technique.

17. The method of claim 14 further including the step of patterning the at least one conductive layer by a laser cutting technique.

18. The method of claim 14 wherein the disposing step includes applying the at least one conductive layer to a surface of the substrate by a photolithography technique.

* * * * *